(12) United States Patent
Ray et al.

(10) Patent No.: US 9,720,501 B2
(45) Date of Patent: Aug. 1, 2017

(54) DYNAMIC TACTILE INTERFACE

(71) Applicant: Tactus Technology, Inc., Fremont, CA (US)

(72) Inventors: Curtis Ray, Fremont, CA (US); Mario Garcia, Fremont, CA (US); Roman Rak, Fremont, CA (US); Rob Ray, Fremont, CA (US); Max Shimshak, Fremont, CA (US); Michael Ray, Fremont, CA (US); David Anvar, Fremont, CA (US); Forrest Grinstead, Fremont, CA (US); Nathan Knapp, Fremont, CA (US); Micah Yairi, Fremont, CA (US); Craig Ciesla, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 67 days.

(21) Appl. No.: 14/682,920

(22) Filed: Apr. 9, 2015

(65) Prior Publication Data
US 2015/0293633 A1    Oct. 15, 2015

Related U.S. Application Data

(60) Provisional application No. 61/977,595, filed on Apr. 9, 2014.

(51) Int. Cl.
*G06F 3/041* (2006.01)
*G06F 3/0488* (2013.01)
*G06F 3/01* (2006.01)

(52) U.S. Cl.
CPC ............. *G06F 3/016* (2013.01); *G06F 3/041* (2013.01); *G06F 3/0414* (2013.01); *G06F 3/0488* (2013.01); *G06F 2203/04809* (2013.01)

(58) Field of Classification Search
CPC ................................ G06F 3/041; G06F 3/0414
See application file for complete search history.

(56) References Cited

U.S. PATENT DOCUMENTS

| 2,885,967 | A | 5/1959 | C et al. |
| 3,034,628 | A | 5/1962 | Wadey |

(Continued)

FOREIGN PATENT DOCUMENTS

| CN | 1260525 A | 7/2000 |
| CN | 1530818 A | 9/2004 |

(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

(Continued)

*Primary Examiner* — Patrick F Marinelli
(74) *Attorney, Agent, or Firm* — Jeffrey Schox; Padowithz Alce

(57) ABSTRACT

One variation of a dynamic tactile interface includes: a tactile layer including a deformable region and a peripheral region adjacent the deformable region; a substrate coupled to the tactile layer, the substrate defining fluid channel and cooperating with the deformable region to define a variable volume fluidly coupled to the fluid channel; a displacement device coupled to the bladder, displacing fluid into the variable volume to transition the deformable region from the retracted setting to the expanded setting, and displacing fluid out of the variable volume to transition the deformable region from the expanded setting to the retracted setting, the displacement device defining a equilibrium range of fluid pressures within the fluid channel; a reservoir fluidly (Continued)

coupled to the fluid channel and supporting a reserve volume of fluid; and a valve selectively controlling transfer of fluid from the reservoir to the fluid channel.

3 Claims, 12 Drawing Sheets

(56) References Cited

U.S. PATENT DOCUMENTS

| | | | |
|---|---|---|---|
| 3,441,111 A | 4/1969 | P | |
| 3,453,967 A | 7/1969 | L et al. | |
| 3,490,733 A | 1/1970 | Jean | |
| 3,659,354 A | 5/1972 | Sutherland | |
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,181,476 A | 1/1980 | Malbec | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A | 10/1987 | Hatayama et al. | |
| 4,743,895 A | 5/1988 | Alexander | |
| 4,772,205 A | 9/1988 | Chlumsky et al. | |
| 4,920,343 A | 4/1990 | Schwartz | |
| 4,940,734 A | 7/1990 | Ley et al. | |
| 4,980,646 A | 12/1990 | Zemel | |
| 5,090,297 A | 2/1992 | Paynter | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,346,476 A | 9/1994 | Elson | |
| 5,369,228 A | 11/1994 | Faust | |
| 5,412,189 A | 5/1995 | Cragun | |
| 5,459,461 A | 10/1995 | Crowley et al. | |
| 5,470,212 A | 11/1995 | Pearce | |
| 5,488,204 A | 1/1996 | Mead et al. | |
| 5,496,174 A | 3/1996 | Garner | |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,187,398 B1 | 2/2001 | Eldridge | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 | 3/2002 | Schmidt et al. | |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | MacLean et al. | |
| 6,573,844 B1 | 6/2003 | Venolia et al. | |
| 6,636,202 B2 | 10/2003 | Ishmael et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,683,627 B1 | 1/2004 | Ullmann et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,004,655 B2 | 2/2006 | Ferrara | |
| 7,015,894 B2 | 3/2006 | Morohoshi | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,079,111 B2 | 7/2006 | Ho | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |

(56) References Cited

U.S. PATENT DOCUMENTS

| | | |
|---|---|---|
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |

(56) References Cited

U.S. PATENT DOCUMENTS

| | | |
|---|---|---|
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,294,557 B1 | 10/2012 | Saddik et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,570,295 B2 | 10/2013 | Ciesla et al. |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 * | 3/2015 | Ciesla .................. G06F 3/016 340/961 |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 | 3/2016 | Birnbaum |
| 9,372,539 B2 | 6/2016 | Ciesla et al. |
| 9,448,630 B2 * | 9/2016 | Ciesla .................. G06F 3/016 |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0184517 A1 | 10/2003 | Senzui et al. |
| 2003/0206153 A1 | 11/2003 | Murphy |
| 2003/0223799 A1 | 12/2003 | Pihlaja |
| 2003/0234769 A1 | 12/2003 | Cross et al. |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0164148 A1 * | 7/2005 | Sinclair .................. G06F 3/0224 434/112 |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0131624 A1 | 6/2008 | Egami et al. |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |

(56) References Cited

U.S. PATENT DOCUMENTS

| | | |
|---|---|---|
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1* | 7/2009 | Ciesla ............... G06F 3/04886 345/174 |
| 2009/0181724 A1 | 7/2009 | Pettersson |
| 2009/0182501 A1 | 7/2009 | Fyke et al. |
| 2009/0191402 A1 | 7/2009 | Beiermann et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1* | 7/2010 | Craig ............... G06F 3/0202 345/173 |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0253633 A1 | 10/2010 | Nakayama et al. |
| 2010/0283731 A1 | 11/2010 | Grant et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0028305 A1 | 2/2011 | Lim et al. |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0227872 A1 | 9/2011 | Huska et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1 | 10/2011 | Mitchell |
| 2011/0254672 A1 | 10/2011 | Ciesla et al. |
| 2011/0254709 A1* | 10/2011 | Ciesla ............... G06F 3/016 341/20 |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0162774 A1 | 6/2012 | Ishida et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0241718 A1 | 9/2013 | Wang et al. |
| 2013/0275888 A1 | 10/2013 | Williamson et al. |
| 2014/0034469 A1 | 2/2014 | Krumpelman |
| 2014/0043291 A1 | 2/2014 | Ciesla et al. |
| 2014/0132532 A1 | 5/2014 | Yairi et al. |
| 2014/0160044 A1* | 6/2014 | Yairi ............... G06F 3/016 345/173 |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0029658 A1* | 1/2015 | Yairi ............... G06F 1/20 361/679.47 |
| 2015/0064405 A1 | 3/2015 | Koch et al. |
| 2015/0070836 A1* | 3/2015 | Yairi ............... G06F 1/20 361/679.47 |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0177839 A1* | 6/2015 | Ciesla ............... G06F 3/016 345/173 |
| 2015/0205419 A1 | 7/2015 | Calub et al. |

(56) References Cited

U.S. PATENT DOCUMENTS

| | | | |
|---|---|---|---|
| 2015/0293591 A1 | 10/2015 | Yairi et al. | |
| 2015/0293633 A1* | 10/2015 | Ray | G09G 5/003 345/173 |

FOREIGN PATENT DOCUMENTS

| | | |
|---|---|---|
| CN | 1882460 A | 12/2006 |
| CN | 201130336 | 10/2008 |
| EP | 2000884 A1 | 12/2008 |
| EP | 2348801 A2 | 7/2011 |
| EP | 2936476 A1 | 10/2015 |
| GB | 190403152 A | 0/1904 |
| GB | 108771 A | 8/1917 |
| GB | 1242418 A | 8/1971 |
| JP | S63164122 A | 7/1988 |
| JP | 06125188 A | 6/1994 |
| JP | 10255106 | 9/1998 |
| JP | H10255106 | 9/1998 |
| JP | 2004111829 A | 4/2004 |
| JP | 2004178117 A | 6/2004 |
| JP | 2004303268 A | 10/2004 |
| JP | 2006053914 A | 1/2005 |
| JP | 2006268068 A | 10/2006 |
| JP | 2006285785 A | 10/2006 |
| JP | 200964357 A | 3/2009 |
| JP | 2009064357 A | 3/2009 |
| JP | 2010039602 A | 2/2010 |
| JP | 2010072743 A | 4/2010 |
| JP | 2011508935 A | 3/2011 |
| JP | 2014526106 A | 10/2014 |
| KR | 20000010511 | 2/2000 |
| KR | 100677624 B | 1/2007 |
| KR | 20070047767 A | 5/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A1 | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |
| WO | 2011133604 A | 10/2011 |
| WO | 2011133605 A | 10/2011 |
| WO | 2012054781 A | 4/2012 |
| WO | 2013022805 A1 | 2/2013 |
| WO | 2013173624 A2 | 11/2013 |
| WO | 2014047656 A2 | 3/2014 |
| WO | 2014095935 A1 | 6/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Jeong et al., "Tunable Microdoublet Lens Array," Optical Society of America, Optics Express; vol. 12, No. 11. May 31, 2004, 7 Pages.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

Preumont, A. Vibration Control of Active Structures: An Introduction, Jul. 2011.

* cited by examiner

DYNAMIC TACTILE INTERFACE

CROSS-REFERENCE TO RELATED APPLICATIONS

This application claims the benefit of U.S. Provisional Application No. 61/977,595, filed 9 Apr. 2014, which is incorporated in its entirety by this reference.

This application is related to U.S. patent application Ser. No. 11/969,848, filed on 4 Jan. 2008, U.S. patent application Ser. No. 13/414,589, filed 7 Mar. 2012, U.S. patent application Ser. No. 13/456,010, filed 25 Apr. 2012, U.S. patent application Ser. No. 13/456,031, filed 25 Apr. 2012, U.S. patent application Ser. No. 13/465,737, filed 7 May 2012, and U.S. patent application Ser. No. 13/465,772, filed 7 May 2012, all of which are incorporated in their entireties by this reference.

TECHNICAL FIELD

This invention relates generally to touch-sensitive displays, and more specifically to a new and useful dynamic tactile interface in the field of touch-sensitive displays.

DESCRIPTION OF THE EMBODIMENTS

The following description of embodiments of the invention is not intended to limit the invention to these embodiments, but rather to enable any person skilled in the art to make and use this invention.

Figure 1:
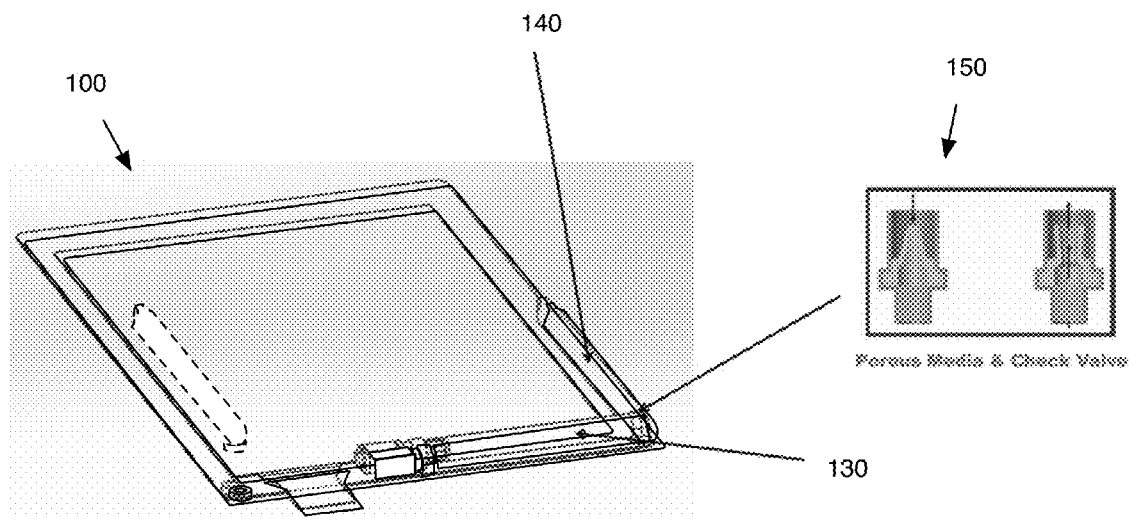
FIG. 1 is a schematic representation of a dynamic tactile interface of one embodiment of the invention.
Figure 2:
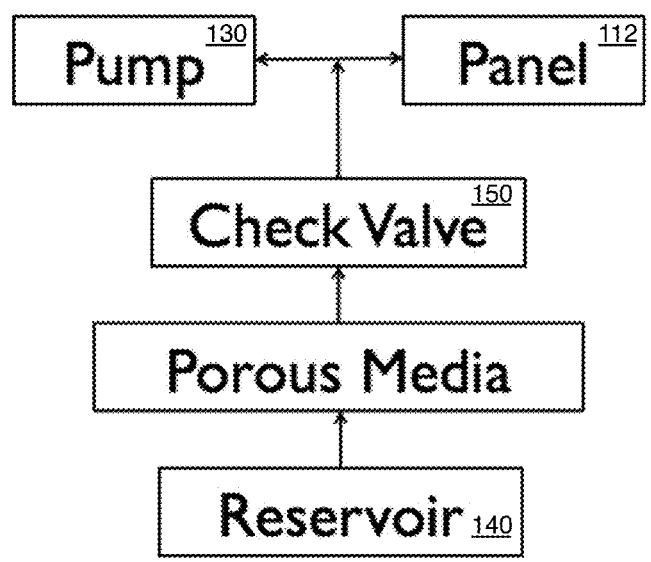
FIG. 2 is a flowchart representation of one variation of the dynamic tactile interface.
Figure 3:
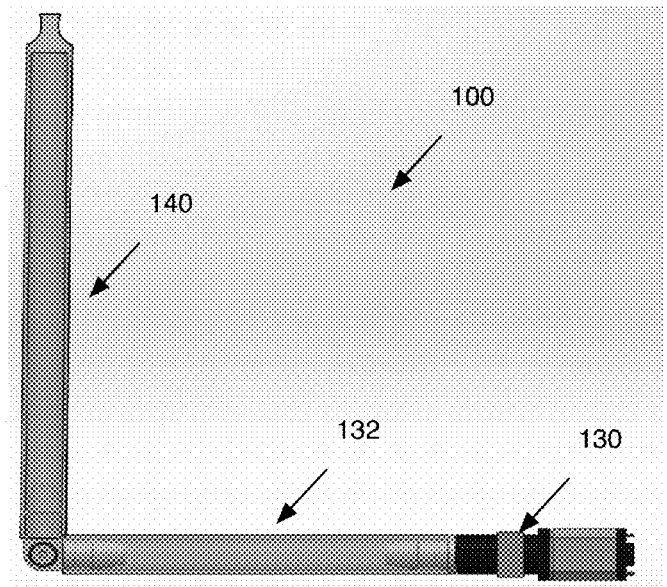
FIG. 3 is a schematic representation of one variation of the dynamic tactile interface.
Figure 4:
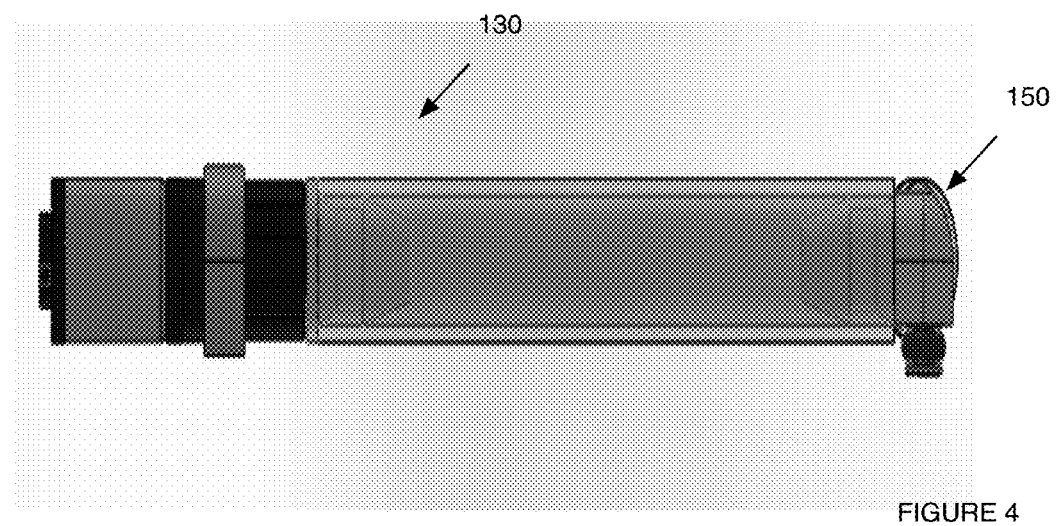
FIG. 4 is a schematic representation of one variation of the dynamic tactile interface.
Figure 5:
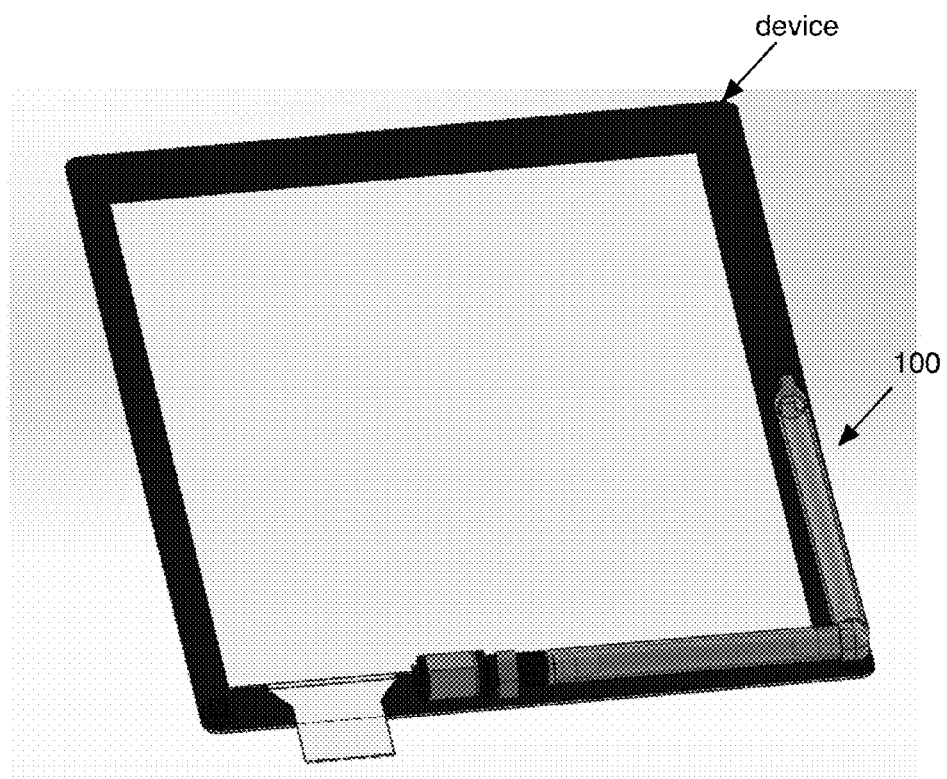
FIG. 5 is a schematic representation of one variation of the dynamic tactile interface.
Figure 6:
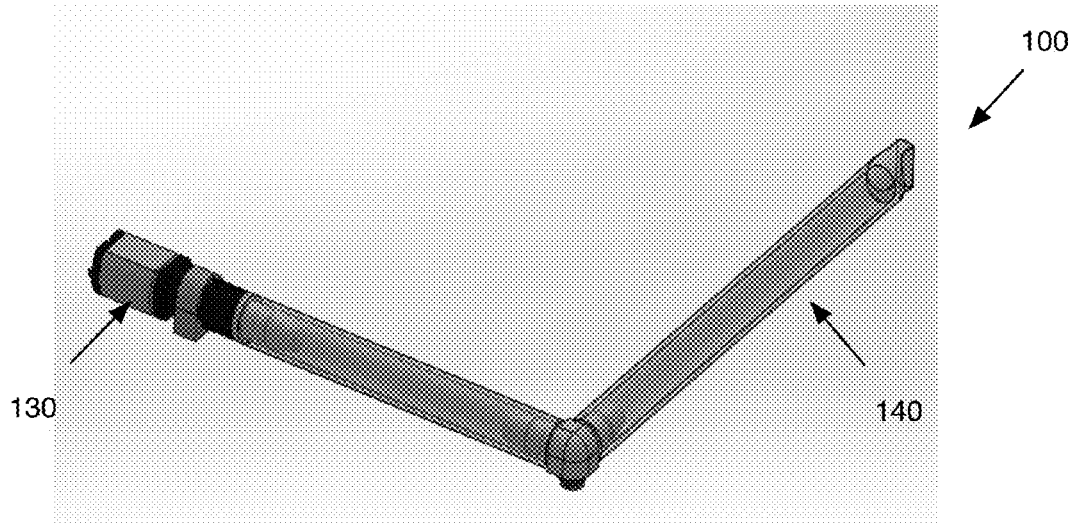
FIG. 6 is a schematic representation of one variation of the dynamic tactile interface.

As shown in FIG. 1, a dynamic tactile interface 100 includes: a tactile layer 120 including a deformable region and a peripheral region adjacent the deformable region. The deformable region can operate between a retracted setting and an expanded setting tactilely distinguishable from the retracted setting. The dynamic tactile interface 100 also includes a substrate 110 coupled to the tactile layer 120, the substrate no defining a fluid channel 112 and cooperating with the deformable region to define a variable volume fluidly coupled to the fluid channel. A displacement device 130 fluidly couples to the fluid channel and displaces fluid into the variable volume to transition the deformable region from the retracted setting to the expanded setting and displacing fluid out of the variable volume to transition the deformable region from the expanded setting to the retracted setting. The displacement device 130 can define an equilibrium range of fluid pressures within the fluid channel. A reservoir 140 fluidly couples to the fluid channel and supports a reserve volume of fluid. A valve 150 selectively controls transfer of fluid from the reservoir to the fluid channel to restore pressure within the equilibrium range in response to a global pressure in the fluid channel less than a lower pressure bound of the equilibrium range of fluid pressures.

Figure 12:
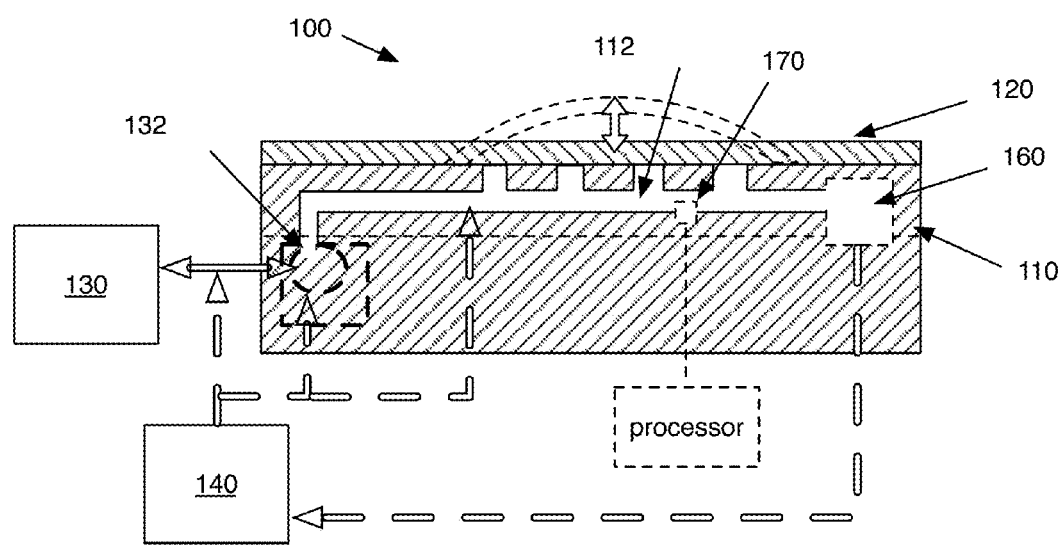
FIG. 12 is a schematic representation of the dynamic tactile interface.
Figure 13:
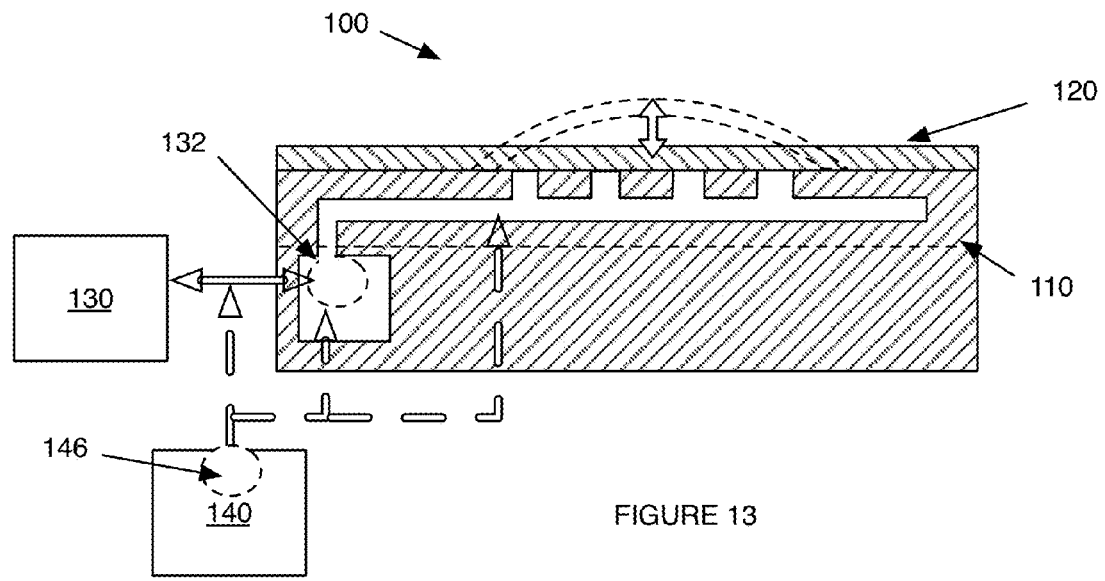
FIG. 13 is a schematic representation of a variation of the dynamic tactile interface depicting various possible reservoir connections to the main fluid circuit.

As shown in FIG. 12, one variation of the dynamic tactile interface 100 further includes a bladder 132 fluidly coupled to fluid channel 112, supporting a volume of fluid, and coupled to the substrate 110. In this variation, the displacement device 130 couples to the bladder 132, displacing fluid from the bladder into the variable volume to transition the deformable region from the retracted setting to the expanded setting, and displacing fluid out of the variable volume into the bladder to transition the deformable region from the expanded setting to the retracted setting, the displacement device defining a equilibrium range of fluid pressures within the fluid channel.

Another variation of the dynamic tactile interface further includes a relief vessel 160 fluidly coupled to the fluid channel 112 opposite the fluid channel from the reservoir 140 and supporting excess fluid transferred from the fluid channel in response to pressure in the fluid channel greater than an upper pressure bound of the equilibrium range of fluid pressures.

1. Applications

The dynamic tactile interface includes a reservoir from which fluid can be transferred in response to a change in the volume of fluid within a fluid circuit; the variable volume, the fluid channels, the bladder, and the dynamic tactile layer make up the fluid circuit. Generally, the reservoir functions to compensate for fluid losses from the fluid circuit by adjusting a volume of fluid in the fluid circuit. The reservoir adjusts the volume of fluid in the fluid circuit so that the displacement device can consistently transition the deformable region between a retracted setting at a first consistent height to an expanded setting at a second consistent height different from the first consistent height. The reservoir also functions to maintain a consistent fluid pressure within the fluid circuit in order to limit effects of evaporation of fluid from the fluid circuit, which can cause the formation of bubbles.

The dynamic tactile interface functions as a tactile interface with a dynamic surface for a device to provide intermittent tactile guidance to an input region of the device. For example, the dynamic tactile interface can be integrated or applied over a touchscreen of a mobile computing device to provide tactile guidance to a user interacting with the touchscreen to control the device. In one implementation, the deformable region can be planar or flush with the peripheral region in the retracted setting, and raised above the peripheral region to define a tactilely distinguishable feature on the tactile surface in the expanded setting. In this implementation, the deformable region can coincide with (i.e., be arranged over and aligned with) an input key rendered on a display of the device such that the deformable region mimics a raised physical hard key in the expanded setting. Thus, the deformable region functions to tactilely guide selection of the corresponding input key into a touch sensor of the device. The deformable region can then be retracted to yield a flush, smooth, and/or continuous surface and to yield substantially minimal optical distortion of an image rendered by the device across the deformable and peripheral regions. For example, the displacement device can transition the deformable region into the expanded setting when the user is providing or has been prompted to provide an input into the touchscreen, such as with a finger or with a stylus. In this example, the displacement device can then transition the deformable region back to the retracted setting when the user is no longer providing or has not been prompted to provide an input into the touchscreen (e.g., when the input key is no longer display adjacent the deformable region), such that the tactile surface is substantially planar or flush with the peripheral region. Thus, in the retracted setting, the deformable region can yield reduced optical distortion of an image output by the display and transmitted through the tactile layer.

In particular, the dynamic tactile interface incorporates a dynamic tactile layer described in U.S. patent application Ser. Nos. 11/969,848, 13/414,589, 13/456,010, 13/456,031, 13/465,737, and 13/465,772, which are incorporated in their entireties by this reference, and additional components to supply additional fluid or compensated fluid to the dynamic tactile layer over time. For example, fluid displaced by the displacement device to expand and retract one or more deformable regions within the dynamic tactile layer can be absorbed into a substrate or a tactile layer of the dynamic tactile layer over time, thereby reducing a total volume of fluid available to the system over time (e.g., over several days, weeks, or months). As the total volume of available fluid decreases within a fluid circuit—that is, fluid channels, fluid conduits, and the displacement device, etc.—within the dynamic tactile interface, that can change maximum height, stiffness, or size of a deformable region in the expanded setting, yield optical aberrations in the dynamic tactile layer, or produce other non-desirable tactile or visual changes within the dynamic tactile interface as fluid is pumped into the dynamic tactile layer to expand one or more deformable regions. Such changes can adversely affect optical clarity or tactile feel of the dynamic tactile layer and can, therefore, adversely affect the user's viewing experience of an image rendered on a display behind the dynamic tactile layer or the user's tactile experience while interacting with a "button" 115 (i.e., a deformable region in the expanded setting) of the dynamic tactile interface. Thus, the reservoir and the valve of the dynamic tactile interface cooperate to provide additional fluid to the fluid circuit over time to compensate for fluid loss due to evaporation to ambient, absorption into the dynamic tactile layer (and/or other components of the dynamic tactile interface), slow leakage from the fluid circuit, etc.

Furthermore, fluid contained in the dynamic tactile layer and pumped into and out of the dynamic tactile layer by the displacement device to expand and retract one or more deformable regions can contain multiple components that evaporate to ambient or are absorbed by the dynamic tactile layer (or other components of the dynamic tactile interface) at different rates. Thus, optical properties of the fluid within the fluid circuit—such as the (average) index of refraction or the Abbe number of the fluid—may change over time as components of the fluid are lost at different rates. The reservoir can, therefore, contain fluid with a different ratio (or concentrations) of components (e.g., by volume or by mass) such that ingress of reserve fluid 146 from the reservoir into the displacement device and/or into the dynamic tactile layer compensates for preferential component loss of the fluid. For example, the fluid circuit of the dynamic tactile interface can be initially filled with a fluid containing three parts component A, one part component B, and one part component C, wherein component A is lost (e.g., through absorption or evaporation) at a rate of 0.5 milliliters per 1000 hours, wherein component B is lost (e.g., through absorption or evaporation) at a rate of 0.1 milliliters per 1000 hours, and wherein component C shows no measurable loss per 1000 hours. In this example, the reservoir can be filled with a volume of reserve fluid containing fifteen parts component A, one part component B, and none of component C such that loss of components A and B from the fluid circuit can be compensated by feeding the reserve fluid from the reservoir into the fluid circuit at a rate approximating a rate of fluid loss from the fluid circuit.

In order to retract the deformable region from the expanded setting to the retracted setting, the displacement device can draw fluid from the dynamic tactile interface layer into a bladder. At an initial time, the fluid circuit, which includes the fluid channels, fluid conduits, bladder, variable volume, and dynamic tactile interface layer, contains an initial volume of fluid at an initial pressure. Over time, fluid loss yields a smaller volume of fluid within the fluid circuit. When the displacement device draws fluid back into the variable volume to retract the deformable region, at the initial time, the displacement device can return a constant volume of fluid from the fluid channel back to the variable volume. However, when fluid is lost from the fluid circuit due to absorption, evaporation, and/or leakage and the volume of the fluid within the fluid circuit thus decreases, the act of drawing a constant volume of fluid back into the variable volume may yield a new pressure within the variable volume lower than the initial pressure within the variable volume. The new lower pressure in combination with the same ambient temperature may thus cause dissolved gas in the fluid to come out of solution boiling of fluid within the fluid circuit can cause the formation of bubbles in the fluid, which can cause optical aberrations, yield inefficient expansion and retraction of the deformable region, affect the lifespan of the constituent hardware of the dynamic tactile interface device, etc.

2. Dynamic Tactile Interface

The tactile layer 120 of the dynamic tactile interface 100 can include an attachment surface, a peripheral region, and a deformable region adjacent the peripheral region. The deformable region is operable between a retracted setting and an expanded setting. In the expanded setting, the deformable region can be tactilely distinguishable from the peripheral region and from the deformable region in the retracted setting. Generally, the tactile layer functions to define one or more deformable regions arranged over a corresponding variable volume, such that displacement of fluid into and out of the variable volumes (i.e., via the fluid channel) causes the deformable region(s) to expand and retract, respectively, thereby yielding a tactilely distinguishable formation on the tactile surface. The tactile surface defines an interaction surface through which a user can provide an input to an electronic device that incorporates (e.g., integrates) the dynamic tactile interface. The deformable region defines a dynamic region of the tactile layer, which can expand to define a tactilely distinguishable formation on the tactile surface in order to, for example, guide a user input to an input region of the electronic device. The tactile layer is attached to the substrate across and/or along a perimeter of the peripheral region (e.g., adjacent to or around the deformable region) such as in substantially planar form. The deformable region can be substantially flush with the peripheral region in the retracted setting and elevated above the peripheral region in the expanded setting, or the deformable region can be arranged at a position offset vertically above or below the peripheral region in the retracted setting.

The tactile layer can be substantially opaque or semi-opaque, such as in an implementation in which the tactile layer is applied over (or otherwise coupled to) a computing device without a display. For example, the substrate can include one or more layers of colored opaque silicone adhered to a substrate of aluminum. In this implementation, an opaque tactile layer can yield a dynamic tactile interface for receiving inputs on, for example, a touch sensitive surface of a computing device. The tactile layer can alternatively be transparent, translucent, or of any other optical clarity suitable for transmitting light emitted by a display across the tactile layer. For example, the tactile layer can include one or more layers of a urethane, polyurethane, silicone, and/or an other transparent material and bonded to the substrate of polycarbonate, acrylic, urethane, PET, glass, and/or silicone, such as described in U.S. patent application Ser. No. 14/035,851. Thus, the tactile layer can function as a dynamic tactile interface for the purpose of guiding, with the deformable region, an input to a region of the display corresponding to a rendered image. For example, the deformable regions can function as a transient physical keys corresponding to discrete virtual keys of a virtual keyboard rendered on a display coupled to the dynamic tactile interface.

The tactile layer can be elastic (or flexible, malleable, and/or extensible) such that the tactile layer can transition between the expanded setting and the retracted setting at the deformable region. As the peripheral region can be attached to the substrate, the peripheral region can substantially maintain a configuration (e.g., a planar configuration) as the deformable region transitions between the expanded setting and retracted setting. Alternatively, the tactile layer can include both an elastic portion and a substantially inelastic (e.g., rigid) portion. The elastic portion can define the deformable region; the inelastic portion can define the peripheral region. Thus, the elastic portion can transition between the expanded and retracted setting and the inelastic portion can maintain a configuration as the deformable region transitions between the expanded setting and retracted setting. The tactile layer can be of one or more layers of PMMA (e.g., acrylic), silicone, polyurethane elastomer, urethane, PETG, polycarbonate, or PVC. Alternatively, the tactile layer can be of one or more layers of any other material suitable to transition between the expanded setting and retracted setting at the deformable region.

The tactile layer can include one or more sublayers of similar or dissimilar materials. For example, the tactile layer can include a silicone elastomer sublayer adjacent the substrate and a polycarbonate sublayer joined to the silicone elastomer sublayer and defining the tactile surface. Optical properties of the tactile layer can be modified by impregnating, extruding, molding, or otherwise incorporating particulate (e.g., metal oxide nanoparticles) into the layer and/or one or more sublayers of the tactile layer.

Figure 10A:
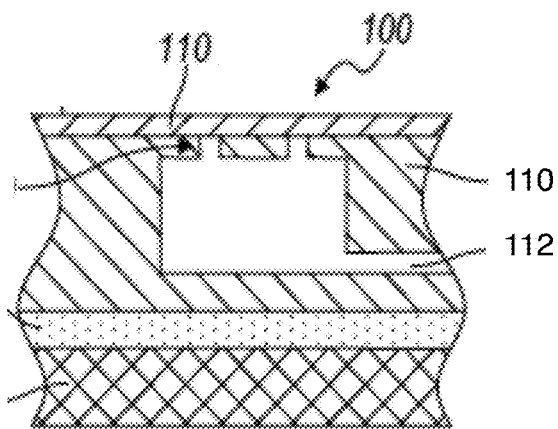
FIGS. 10A, 10B, and 10C are schematic representations in accordance with one variation of the dynamic tactile interface.
Figure 10C:
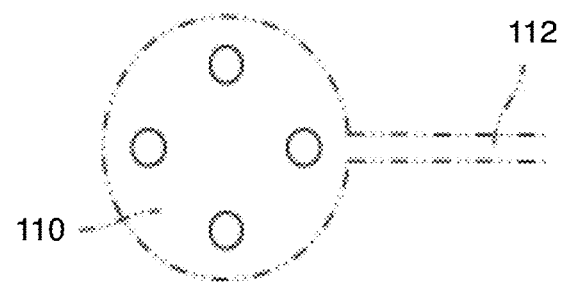
Figure 10B:
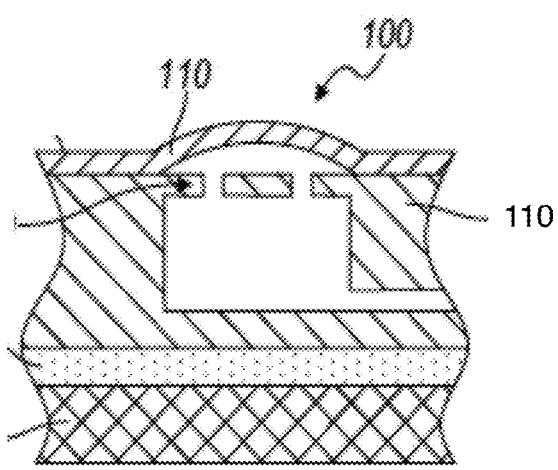
Figure 11:
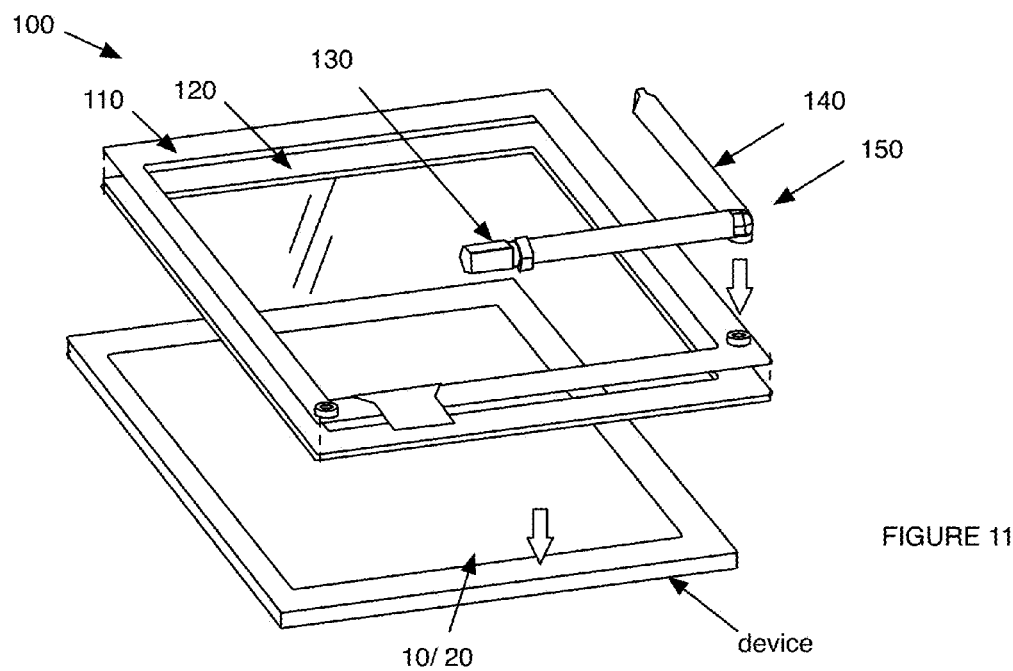
FIG. 11 is an exploded schematic representation of a variation of the dynamic tactile interface with a device.

As described in U.S. application Ser. No. 14/035,851, in the expanded setting, the deformable region defines a tactilely distinguishable formation defined by the deformable region in the expanded setting can be dome-shaped, ridge-shaped, ring-shaped, crescent-shaped, or of any other suitable form or geometry. The deformable region can be substantially flush with the peripheral region in the retracted setting and the deformable region is offset above the peripheral region in the expanded setting (e.g., as shown in FIG. 10B). When fluid is (actively or passively) released from behind the deformable region of the tactile layer, the deformable region can transition back into the retracted setting (shown in FIG. 10A). Alternatively, the deformable region can transition between a depressed setting and a flush setting, the deformable region in the depressed setting offset below flush with the peripheral region and deformed within the variable volume, the deformable region in the flush setting substantially flush with the deformable region. Additionally, the deformable regions can transition between elevated positions of various heights relative to the peripheral region to selectively and intermittently provide tactile guidance at the tactile surface over a touchscreen (or over any other surface), such as described in U.S. patent application Ser. No. 11/969,848, U.S. patent application Ser. No. 13/414,589, U.S. patent application Ser. No. 13/456,010, U.S. patent application Ser. No. 13/456,031, U.S. patent application Ser. No. 13/465,737, and/or U.S. patent application Ser. No. 13/465,772. The deformable region can also define any other vertical position relative to the peripheral region in the expanded setting and retracted setting.

However, the tactile layer can be of any other suitable material and can function in any other way to yield a tactilely distinguishable formation at the tactile surface.

The dynamic tactile interface 100 also includes the substrate no coupled to the attachment surface at the peripheral region and defining a variable volume and a fluid channel fluidly coupled to the variable volume, the variable volume adjacent the deformable region. Generally, the substrate functions to define a fluid circuit between the displacement device and the deformable region and to support and retain the peripheral region of the tactile layer. Alternatively, the substrate and the tactile layer can be supported by a touchscreen once installed on a computing device. For example the substrate can be of a similar material as and/or similarly or relatively less rigid than the tactile layer, and the substrate and the tactile layer can derive support from an adjacent touchscreen of a computing device. The substrate can further define a support member to support the deformable region against inward deformation past the peripheral region.

The substrate can be substantially opaque or otherwise substantially non-transparent or translucent. For example, the substrate can be opaque and arranged over an off-screen region of a mobile computing device. In another example application, the dynamic tactile interface can be arranged in a peripheral device without a display or remote from a display within a device, and the substrate can, thus, be substantially opaque. Thus, the substrate can include one or more layers of nylon, acetal, delrin, aluminum, steel, or other substantially opaque material.

Alternatively (or additionally), the substrate can be substantially transparent or translucent. For example, in one implementation, wherein the dynamic tactile interface includes or is coupled to a display, the substrate can be substantially transparent and transmit light output from an adjacent display. The substrate can be PMMA, acrylic, and/or of any other suitable transparent or translucent material. The substrate can alternatively be surface-treated or chemically-altered PMMA, glass, chemically-strengthened alkali-aluminosilicate glass, polycarbonate, acrylic, polyvinyl chloride (PVC), glycol-modified polyethylene terephthalate (PETG), polyurethane, a silicone-based elastomer, or any other suitable translucent or transparent material or combination thereof. In one application in which the dynamic tactile interface is integrated or transiently arranged over a display and/or a touchscreen, the substrate can be substantially transparent. For example, the substrate can include one or more layers of a glass, acrylic, polycarbonate, silicone, and/or other transparent material in which the fluid channel and variable volume are cast, molded, stamped, machined, or otherwise formed.

Additionally, the substrate can include one or more transparent or translucent materials. For example, the substrate can include a glass base sublayer bonded to walls or boundaries of the fluid channel and the variable volume. The substrate can also include a deposited layer of material exhibiting adhesion properties (e.g., an adhesive tie layer or film of silicon oxide film). The deposited layer can be distributed across an attachment surface of the substrate to which the tactile adheres and function to retain contact between the peripheral region of the tactile layer and the attachment surface of the substrate despite fluid pressure raising above the peripheral region the deformable region and, thus, attempting to pull the tactile layer away from the substrate. Additionally, the substrate can be substantially relatively rigid, relatively elastic, or exhibit any other material rigidity property. However, the substrate can be formed in any other way, be of any other material, and exhibit any other property suitable to support the tactile layer and define the variable volume and fluid channel. Likewise, the substrate (and the tactile layer) can include a substantially transparent (or translucent) portion and a substantially opaque portion. For example, the substrate can include a substantially transparent portion arranged over a display and a substantially opaque portion adjacent the display and arranged about a periphery of the display.

The substrate can define the attachment surface, which functions to retain (e.g., hold, bond, and/or maintain the position of) the peripheral region of the tactile layer. In one implementation, the substrate is planar across the attachment surface such that the substrate retains the peripheral region of the tactile layer in planar form, such as described in U.S. patent application Ser. No. 12/652,708. However, the attachment surface of the substrate can be of any other geometry and retain the tactile layer in any other suitable form. For example, the substrate can define a substantially planar surface across an attachment surface and a support member adjacent the tactile layer, the attachment surface retaining the peripheral region of the tactile layer, and the support member adjacent and substantially continuous with the attachment surface. The support member can be configured to support the deformable region against substantial inward deformation into the variable volume (e.g., due to an input applied to the tactile surface at the deformable region), such as in response to an input or other force applied to the tactile surface at the deformable region. In this example, the substrate can define the variable volume, which passes through the support member, and the attachment surface can retain the peripheral region in substantially planar form. The deformable region can rest on and/or be supported in planar form against the support member in the retracted setting, and the deformable region can be elevated off of the support member in the expanded setting.

In another implementation, the support member can define a fluid conduit, such that the fluid conduit communicates fluid from the fluid channel through the support member and toward the deformable region to transition the deformable region from the retracted setting to the expanded setting.

The substrate can define (or cooperate with the tactile layer, a display, etc. to define) the fluid conduit that communicates fluid from the fluid channel to the deformable region of the tactile layer. The fluid conduit can substantially correspond to (e.g., lie adjacent) the deformable region of the tactile layer. The fluid conduit can be machined, molded, stamped, etched, etc. into or through the substrate and can be fluidly coupled to the fluid channel, the displacement device, and the deformable region. A bore intersecting the fluid channel can define the fluid conduit such that fluid can be communicated from the fluid channel toward the fluid conduit, thereby transitioning the deformable region from the expanded setting to the retracted setting. The axis of the fluid conduit can be normal a surface of the substrate, can be non-perpendicular with the surface of the substrate, of non-uniform cross-section, and/or of any other shape or geometry. For example, the fluid conduit can define a crescent-shaped cross-section. In this example, the deformable region can be coupled to (e.g., be bonded to) the substrate along the periphery of the fluid conduit. Thus, the deformable region can define a crescent-shape offset above the peripheral region in the expanded setting.

The substrate can define (or cooperate with the sensor, a display, etc. to define) the fluid channel that communicates fluid through or across the substrate to the fluid conduit. For example, the fluid channel can be machined or stamped into the back of the substrate opposite the attachment surface, such as in the form of an open trench or a set of parallel open trenches. The open trenches can then be closed with a substrate backing layer, the sensor, and/or a display to form the fluid channel. A bore intersecting the open trench and passing through the attachment surface can define the fluid conduit, such that fluid can be communicated from the fluid channel to the fluid conduit (and toward the tactile layer) to transition the deformable region (adjacent the fluid conduit) between the expanded setting and retracted setting. The axis of the fluid conduit can be normal the attachment surface, can be non-perpendicular with the attachment surface, of non-uniform cross-section, and/or of any other shape or geometry. Likewise, the fluid channel be parallel the attachment surface, normal the attachment surface, non-perpendicular with the attachment surface, of non-uniform cross-section, and/or of any other shape or geometry. However, the fluid channel and the fluid conduit can be formed in any other suitable way and be of any other geometry.

In one implementation, the substrate can define a set of fluid channels. Each fluid channel in the set of fluid channels can be fluidly coupled to a fluid conduit in a set of fluid conduits. Thus, each fluid channel can correspond to a particular fluid conduit and, thus, a particular deformable region. Alternatively, the substrate can define the fluid channel, such that the fluid channel can be fluidly coupled to each fluid conduit in the set of fluid conduits, each fluid conduit fluidly coupled serially along the length of the fluid channel. Thus, each fluid channel can correspond to a particular set of fluid conduits and, thus, deformable regions.

In one variation, the substrate can be of a substantially porous medium or a portion of the substrate can be substantially porous, such that fluid can communicate from the bladder through the substrate or a portion of the substrate. The porous portion of the substrate can be arranged between the reservoir and the fluid channel, the porous portion selectively resisting flow from the reservoir into the fluid channel. For example, the substrate can include a porous lattice of acrylic that is semipermeable to fluid. Fluid can communicate through the substrate through the porous lattice but the small cross-sectional areas of pores of the porous lattice and boundary layers resist flow across the substrate through the pores.

However, the substrate can be of any other suitable material and can function in any other way.

3. Displacement Device

The displacement device 130 of the dynamic tactile interface displaces fluid into the dynamic tactile layer to transition a deformable region from the retracted setting into the expanded setting and displaces fluid out to the dynamic tactile layer to transition the deformable region from the expanded setting into the retracted setting. Generally, the displacement device functions to control a vertical position of one or more deformable regions of the dynamic tactile layer by pumping fluid into and out of the dynamic tactile layer, thereby modulating fluid pressure (and fluid volume) within the dynamic tactile layer to expand and retract one or more deformable regions, such as described in U.S. patent application Ser. Nos. 11/969,848, 13/414,589, 13/456,010, 13/456,031, 13/465,737, and 13/465,772, which are incorporated in their entireties by this reference. The displacement device to pumps or displaces fluid into and/or out of the fluid channel transition the deformable region into the expanded setting and retracted setting, respectively. The displacement device can be fluidly coupled to the displacement device via the fluid channel and the fluid conduits and can further displace fluid from a reservoir (e.g., if the fluid is air, the reservoir can be ambient air from environment) toward the deformable region, such as through one or more valves, as described in U.S. patent application Ser. No. 13/414,589. For example, the displacement device can displace (e.g., pump or compress the bladder filled with fluid) a transparent liquid, such as water, silicone, or alcohol within a closed and sealed system. Alternatively, the displacement device can displace air within a sealed system in a system open to ambient air. For example, the displacement device can pump air from ambient (e.g., environmental air surrounding the device) into the fluid channel to transition the deformable region into the expanded setting, and the displacement device (or an exhaust valve) can exhaust air in the fluid channel to ambient to return the deformable region into the retracted setting.

The displacement device, one or more valves, the substrate, and/or the tactile layer can also cooperate to substantially seal fluid within the fluid system to retain the deformable region in the expanded and/or retracted settings. Alternatively, the displacement device, one or more valves, the substrate, and/or the tactile layer can leak fluid (e.g., to ambient or back into a reservoir), and the displacement device can continuously, occasionally, or periodically pump fluid into (and/or out of) the fluid channel to maintain fluid pressure with fluid channel at a requisite fluid pressure to hold the deformable region in a desired position.

The displacement device can be electrically powered or manually actuated and can transition one or more deformable regions into the expanded setting and retracted setting in response to an input detected at the tactile surface by a sensor (e.g., a pressure or capacitive sensor). For example, in response to an increase in pressure in the fluid channel, the displacement device can displace fluid out of the fluid channel to transition the deformable region from the expanded setting to the retracted setting. In another example, in response to a variation in capacitive decay proximal a deformable region detected by a capacitive sensor, the displacement device can displace fluid out of the fluid channel to transition the deformable region from the expanded setting to the retracted setting.

The dynamic tactile interface can also include multiple displacement devices, such as one displacement device that pumps fluid into the fluid channel to expand the deformable region and one displacement device that pumps fluid out of the fluid channel to retract the deformable region. However, the displacement device can function in any other way to transition the deformable region between the expanded setting and retracted setting.

A variation of the dynamic tactile interface includes a bladder fluidly coupled to the fluid channel and adjacent a back surface of the substrate opposite the tactile layer. In this variation, the displacement device can compress (or otherwise manipulate) the bladder to displace fluid from the bladder into the fluid channel to transition the deformable region from the retracted setting to the expanded setting, as described in U.S. patent application Ser. No. 14/552,312.

In one implementation of the foregoing variation, the displacement device includes an elongated tubular bladder and an (electromechanically or manually-controlled) actuator that twists the tubular bladder to displace fluid out of the bladder and into the dynamic tactile layer, such as described in U.S. patent application Ser. No. 14/081,519, which is incorporated in its entirety by this reference. In this implementation, a first end of the bladder can be coupled to a static block while a second end of the bladder opposite the first end and the second end can be coupled to a rotational motor. The motor can rotate the second end about a central axis through the center of the bladder. As the motor rotates the second end of the bladder, the elongated bladder twists, forming a helical shape, interior surfaces of the collapsing as the helix forms causing fluid to be squeezed out of the elongate bladder as internal volume of the bladder decreases. Subsequently, to return fluid from the dynamic tactile layer back into the bladder, the actuator can return to an initial state and, through its resilience (e.g., elasticity), the bladder can transition back to an initial form (i.e., elongated and non-helical), thereby drawing a vacuum within the fluid circuit to draw fluid out of the dynamic tactile layer into back into the reservoir.

In another implementation, the displacement device includes an elongated bladder and an (electromechanically or manually-controlled) actuator that runs along the axis of the tubular bladder to displace fluid out of the bladder, such as described in U.S. Patent Application No. 61/907,534, which is incorporated in its entirety by this reference. As in the foregoing implementation, to return fluid from the dynamic tactile layer back into the bladder, the actuator can return to an initial state, and, through its resilience, the bladder can transition back to its initial form, thereby drawing a vacuum within the fluid circuit to draw fluid out of the dynamic tactile layer into back into the reservoir.

However, the displacement device can be of any other form and can be actuated in any other suitable way to pump fluid into and/or out of the dynamic tactile layer.

3. Reservoir and Valve

Figure 15:
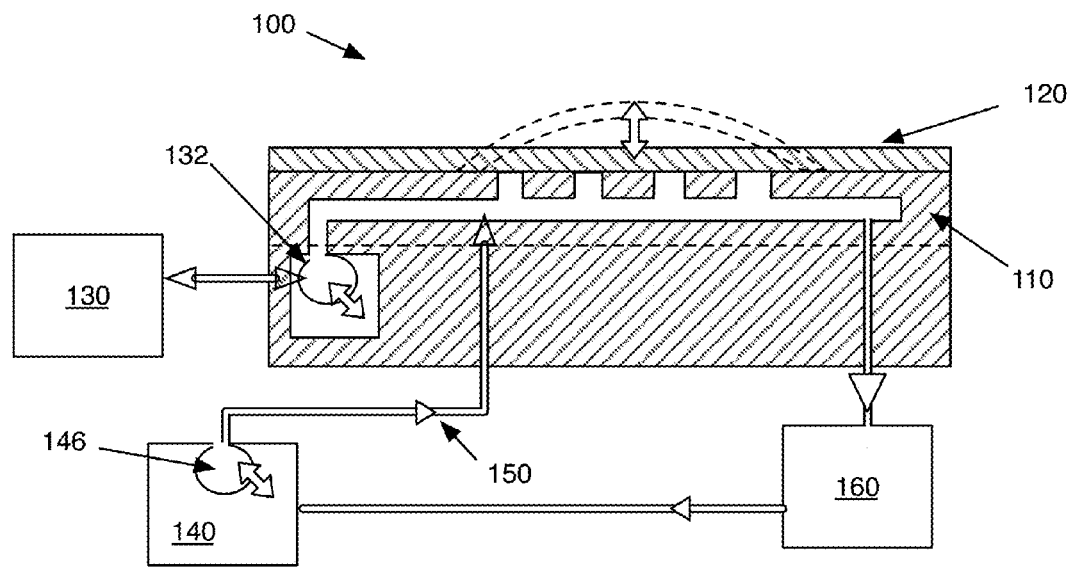
FIG. 15 is a schematic representation of a variation of the dynamic tactile interface including a bladder and a reservoir fluidly connected to the fluid channel by a valve.
Figure 16:
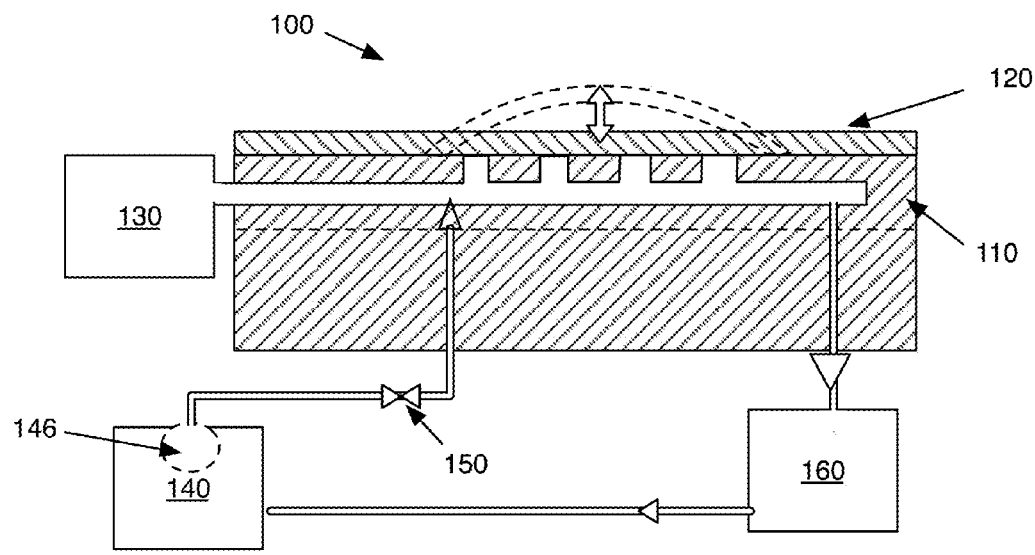
FIG. 16 is a schematic representation of a variation of the dynamic tactile interface without a bladder.

As shown in FIG. 15, the reservoir 140 fluidly couples to the fluid channel 112 and supports a reserve volume of fluid, and the valve 150 selectively controls transfer of fluid from the reservoir to the fluid channel to maintain pressure within the equilibrium range in response to a pressure of fluid in the fluid channel less than a lower pressure bound of the equilibrium range of fluid pressures. Thus, the reservoir of the dynamic tactile interface contains a reserve volume of fluid and the valve of the dynamic tactile interface controls transfer of the reserve volume of fluid from the reservoir into the displacement device of the dynamic tactile interface. Generally, the reservoir functions to contain additional fluid of the same, similar, or compensatory composition as the fluid within the fluid circuit, and the valve functions to (selectively) meter additional fluid from the reservoir into the fluid circuit to compensate for loss of fluid from the fluid circuit.

The reserve fluid 146 can be supplied to the fluid channel under a passive force, such as a vacuum within the fluid circuit or a pressure differential between the reservoir and the fluid circuit. In one example, the valve between the reservoir and the fluid circuit can have a cracking pressure (e.g., opens at a pressure differential) substantially equal to the pressure differential between the reservoir pressure and the equilibrium pressure. Alternatively, the reserve fluid can be actively supplied, wherein a pump or other displacement system can selectively pressurize and/or move reserve fluid into the fluid channel, or a processor can selectively open and close the valve to permit fluid flow therethrough. However, the reserve fluid can be otherwise supplied to the fluid channel.

Figure 7:
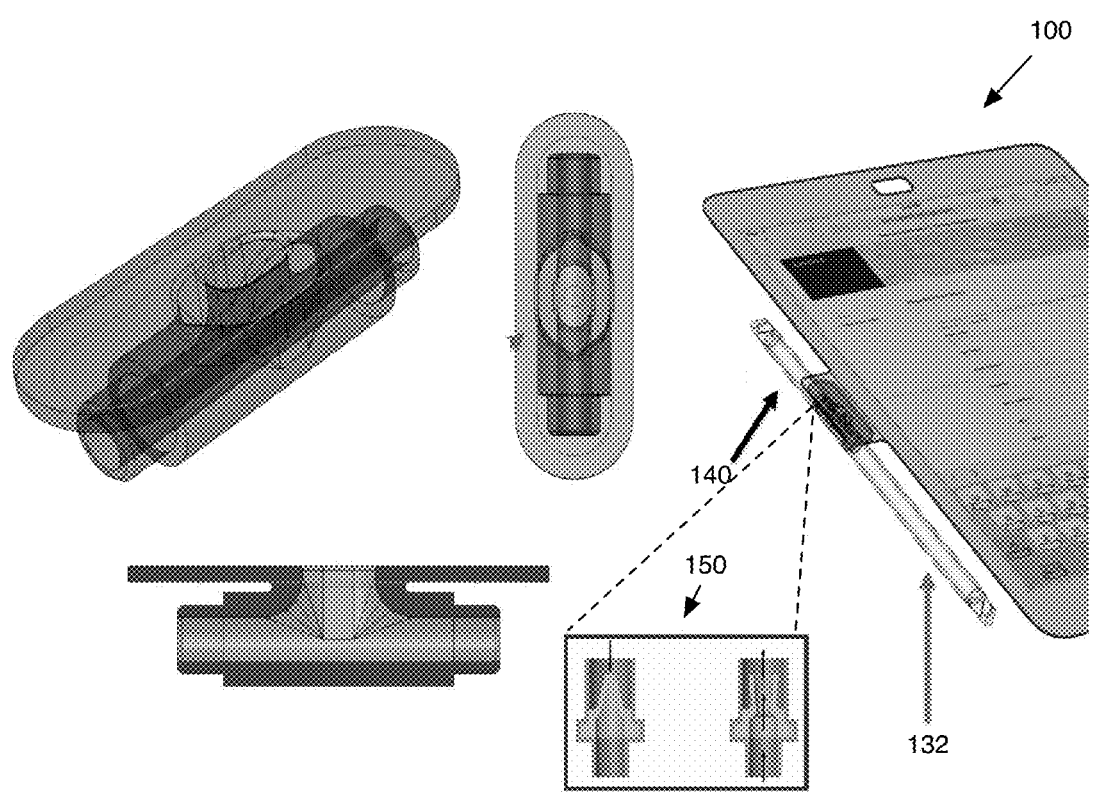
FIG. 7 is a schematic representation of one variation of the dynamic tactile interface.
Figure 8A:
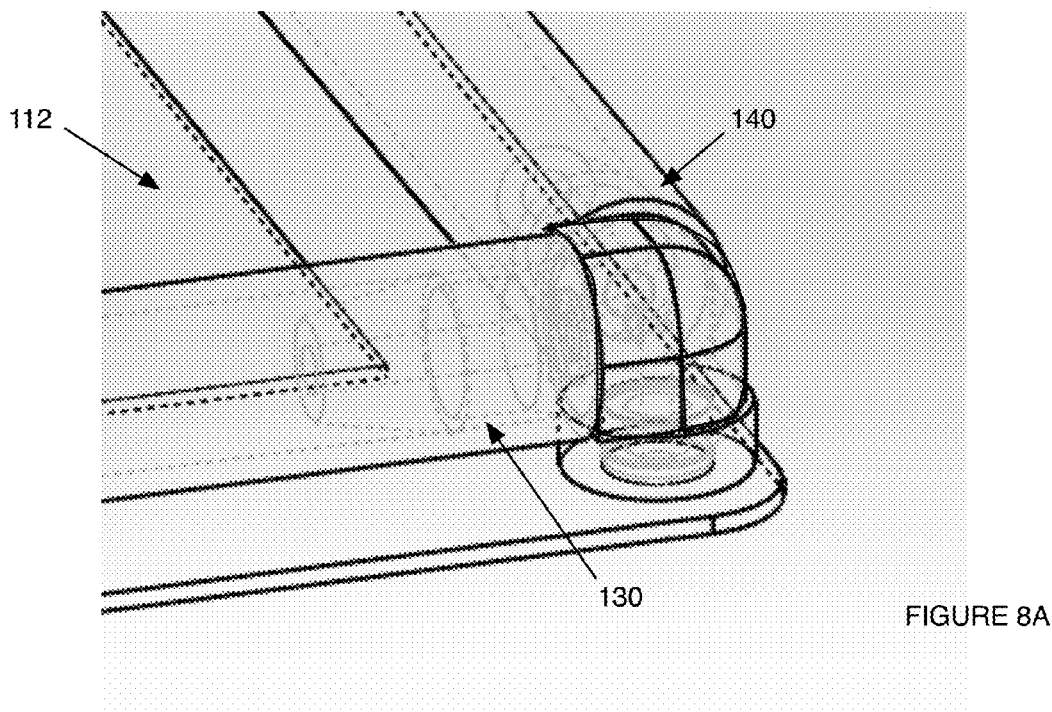
FIGS. 8A and 8B are schematic representations in accordance with one variation of the dynamic tactile interface.
Figure 8B:
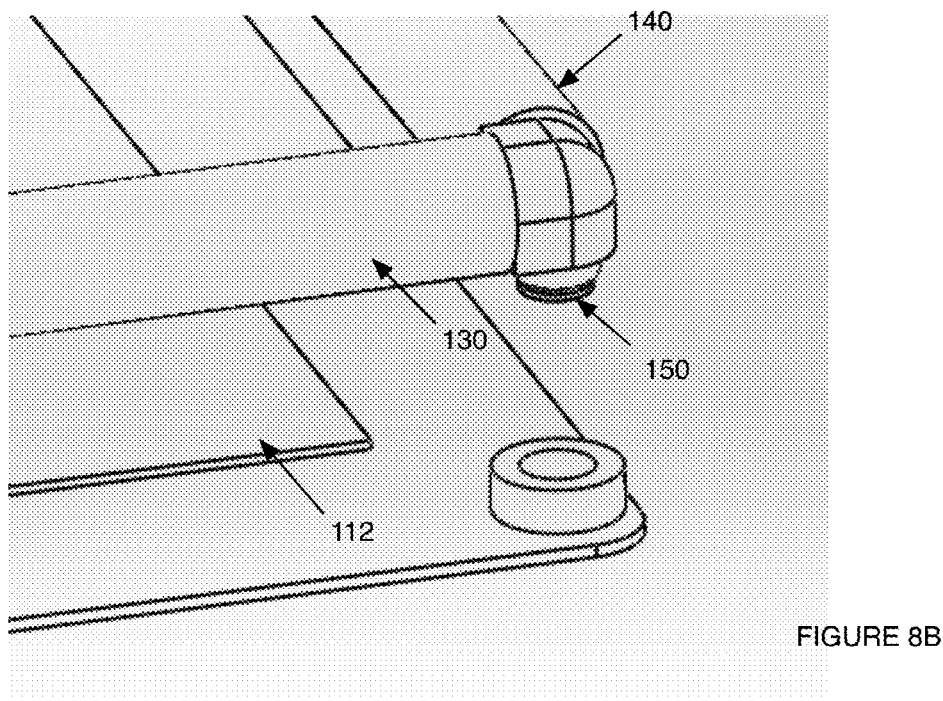
Figure 9:
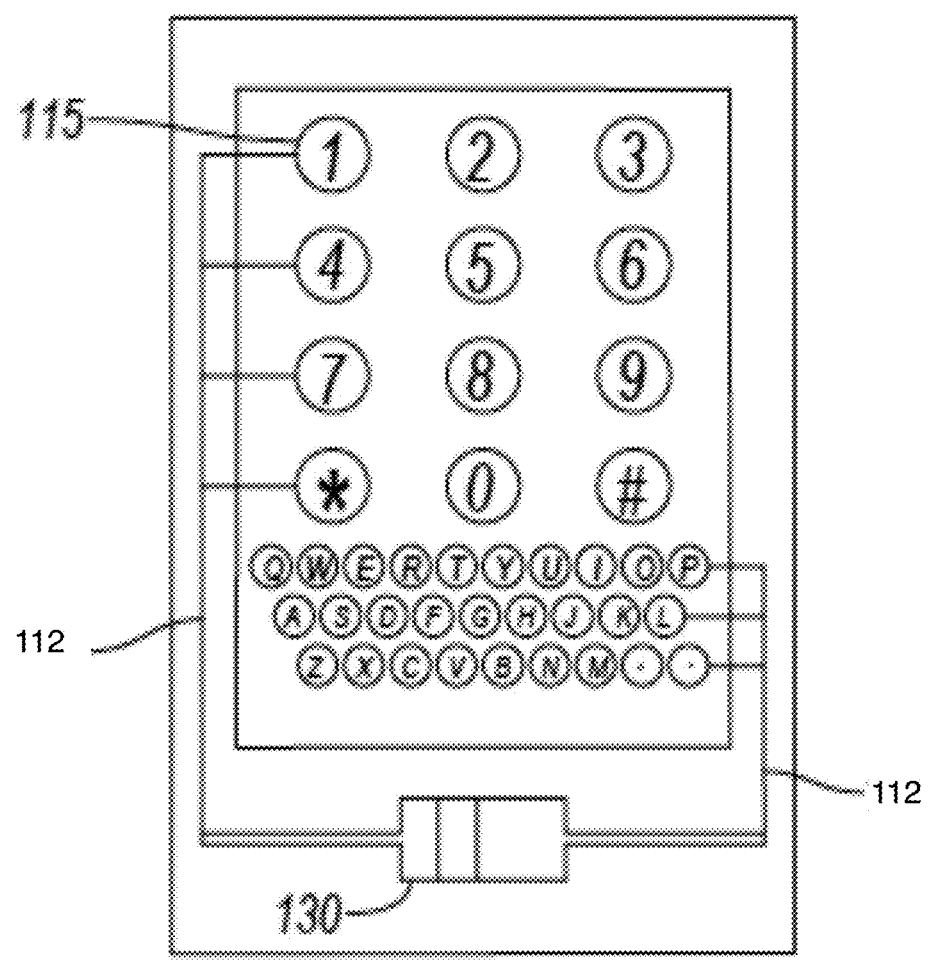
FIG. 9 is a schematic representation of one variation of the dynamic tactile interface.

The reservoir, the bladder and/or the displacement device, and the dynamic tactile layer can be fluidly coupled by a 'T' or 'Y' connector, as shown in the FIG. 7. Alternatively, the reservoir can be fluidly coupled to an inlet of the displacement device via the valve, and an outlet of the displacement device (opposite the inlet of the displacement device) can be fluidly coupled to a via of the dynamic tactile layer, as described in U.S. patent application Ser. No. 14/035,851, which is incorporated in its entirety by this reference. Additionally or alternatively, the reservoir can be fluidly coupled to the fluid channel by a fluid port. In this implementation, the bladder can also be fluidly coupled to the fluid channel. Additionally or alternatively, the reservoir can be fluidly coupled to the fluid channel by porous material 114 defined by the substrate. However, the reservoir can be otherwise connected to the fluid channel.

The reservoir can define a static volume or an adjustable volume. The reservoir preferably applies a substantially constant pressure to the reserve fluid over time (e.g., maintains the reserve fluid at a substantially constant pressure), but can alternatively gradually apply an increasing force on the reserve fluid (e.g., as reserve fluid is supplied to the fluid channel), a decreasing force on the reserve fluid, or apply any other suitable force on the reserve fluid. In one variation, the reservoir is a substantially rigid container. In a second variation, as shown in FIG. 15, the reservoir includes an elastic balloon or bladder that contracts as the reserve fluid is removed. However, the reservoir can have any other suitable form factor.

In the foregoing implementations in which the displacement device includes a bladder, the reservoir can similarly include a reservoir bladder of an elasticity substantially greater than that of the displacement device bladder, such that the reservoir bladder can yield to vacuum in the fluid circuit to release reserve fluid into the fluid circuit. For example, the displacement device bladder can be molded from a polymer sheet 0.5 mm in thickness, and the reservoir bladder can be molded from a sheet of the same polymer but of a thickness of 0.015 mm such that the reservoir bladder yields to much lower hoop stress than the displacement device bladder.

The valve can include a one-way valve permitting fluid flow from the reservoir into the displacement device and/or dynamic tactile layer. Thus, in this implementation, as vacuum is drawn in the fluid circuit by the displacement device, the valve can release fluid from the reservoir into the fluid circuit. The valve 150 can be actively controlled (e.g., by a processor), or passively controlled (e.g., based on pressure differentials between a first and second side of the valve. In operation, the valve can be operable between at least an open and a closed mode. The valve disc preferably actuates to switch the valve between the modes, but the valve body can alternatively or additionally actuate to switch the valve between the modes. The valve 150 can be a check valve, ball valve, butterfly valve, disc valve, choke valve, diaphragm valve, gate valve, poppet valve, or any other suitable type of valve. The valve (or other, secondary valves) can be actively controlled in response to the occurrence of a trigger event to dynamically control the parameters of the fluid within the main fluid circuit. The trigger event can be a change in pressure, a change in temperature, a change in volume, a change in fluid composition, a combination of the above, or be any other suitable trigger event. However, the valve can be otherwise controlled. The valve can be actively controlled by a processor within the interface, a device processor, a remote processor, or by any other suitable control system.

In one implementation of the dynamic tactile interface, the valve 150 includes a ball check valve, which includes a ball configured to seat and create a seal with the valve in order to close the valve and resist fluid flow through the valve in response to pressure in the fluid channel within the equilibrium range or greater than an upper bound of the equilibrium range and configured to release a seal with the valve to open the valve and transfer fluid through the valve in response to pressure in the fluid channel less than the lower bound of the equilibrium range. The ball can be arranged proximal the fluid channel, such that fluid can flow from the reservoir to the fluid channel, but can alternatively be arranged proximal the reservoir (and distal the fluid channel), such that fluid drains from the fluid channel into the reservoir. Generally, the valve can be any other valve suitable to selectively transfer fluid.

The valve can also incorporate a passive lag structure exhibiting a high time constant (e.g., substantial lag) for responding to vacuum in the fluid circuit. For example, as described above, the displacement device can draw vacuum within the fluid circuit to withdraw fluid from the dynamic tactile layer, thereby transitioning or more deformable regions in the dynamic tactile layer from the expanded setting to the retracted setting. In this example, full transition of the deformable region(s) into the retracted setting may require an average of three seconds, and the lag structure can thus yield a time constant substantially greater than the full transition time (e.g., ten seconds) such that deformable region(s) can fully retract and pressure within the fluid circuit stabilize before any fluid is released from the reservoir into the fluid circuit. In particular, if inconsequential fluid loss has occurred (e.g., since a last compensation by the reservoir), transitioning a deformable region from the expanded setting into the retracted setting will yield a vacuum within the fluid circuit as fluid is drawn out of the dynamic tactile layer and back into the displacement device, but this vacuum will stabilize to a neutral pressure (i.e., a pressure substantially identical to an ambient pressure) once the deformable region is fully retracted. However, if fluid loss has occurred within the fluid circuit, a vacuum—relative to ambient pressure—will exist in the fluid circuit well after the deformable region is fully retracted back into the retracted setting due to lack of sufficient volume of fluid to fill the fluid circuit at the present ambient pressure. Thus, once this equilibrium vacuum state is reached in the fluid circuit, the lag structure can yield to the vacuum now existing in steady-state within the fluid circuit to release additional fluid from the reservoir into the fluid circuit. Thus, the displacement device can manipulate fluid pressure within the fluid circuit to transition one or more deformable regions in the dynamic tactile layer between fully expanded and fully retracted settings, and the passive lag structure within or coupled to the valve can release fluid into the fluid circuit substantially only when an equilibrium vacuum state (relative to ambient pressure) exists in the fluid circuit.

For example, the lag structure can include a porous media or a capillary tube, such that the lag structure operates passively to control release of fluid from the reservoir into the fluid circuit.

Alternatively, the dynamic tactile interface can include an active lag structure, such as a timer, a pressure sensor, and a secondary pump that cooperate to actively pump fluid from the reservoir into the fluid circuit in response to detected equilibrium vacuum in the fluid circuit with the deformable region(s) in the retracted setting. In another example, the active lag structure can include an actively-controlled valve. However, the valve can include any other suitable type of lag structure that functions in any other suitable way to control dispensation of reserve fluid from the reservoir into the fluid circuit.

Figure 14:
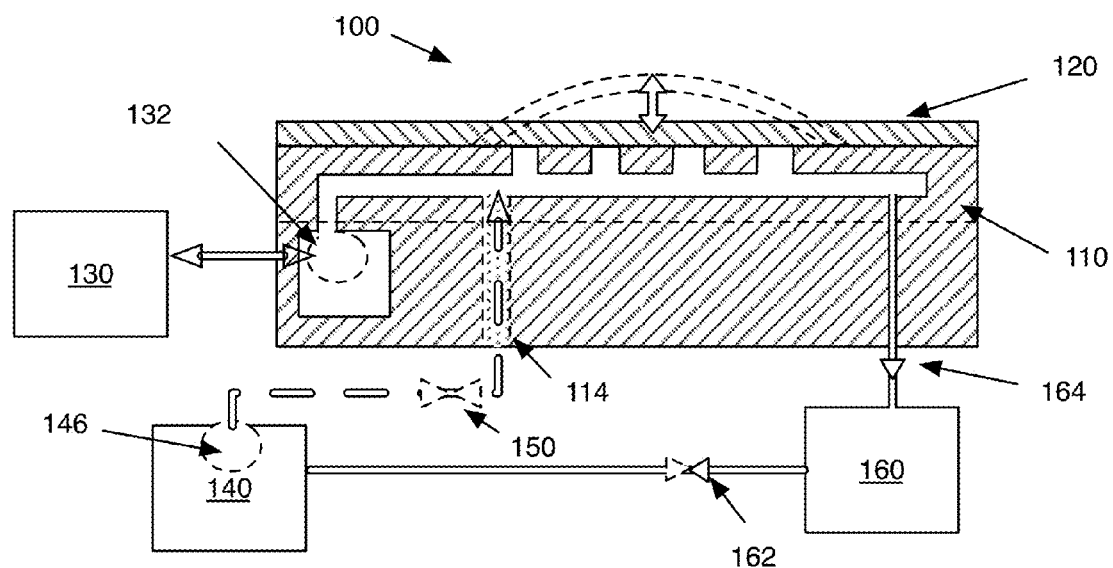
FIG. 14 is a schematic representation of the dynamic tactile interface including a porous interface fluidly connecting the reservoir to the fluid channel and a return vessel fluidly connected to the fluid channel and the reservoir.

As shown in FIGS. 12 and 14, the dynamic tactile interface 100 can additionally include a return vessel 160 fluidly coupled to the fluid channel. The return vessel functions as a relief volume for the fluid channel, wherein excess fluid from the fluid channel can flow from the fluid channel to the return vessel when the fluid channel pressure exceeds a threshold pressure. For example, excess fluid can flow or be otherwise transferred from the fluid channel into the return vessel in response to a pressure in the fluid channel greater than an upper bound of the equilibrium range of fluid pressures. Alternatively or additionally, the return vessel can assist in mixing the reserve fluid with the fluid channel or bladder fluid. Alternatively or additionally, the return vessel can assist in adjusting the fluid parameters of the main fluid (e.g., fluid within the fluid channel and/or bladder) during reserve fluid addition. For example, the return vessel can remove excess reserve fluid added to the main fluid (e.g., wherein the reserve fluid can have different properties from the main fluid, and the return vessel can be arranged to preferentially receive the reserve fluid when added to the fluid channel). The return vessel can be static and define a constant volume, or be actuatable and define an adjustable volume. The return vessel can be substantially solid or be flexible. The return vessel can be actively controlled (e.g., by the pump), or passively controlled (e.g., by pressure gradients generated within the fluid circuit). However, the return vessel can perform any other suitable functionality.

As shown in FIG. 15, the return vessel is preferably fluidly connected to the fluid channel by a return manifold, but can be directly connected to the fluid channel or be otherwise connected to the fluid channel. The return manifold can be fluidly separate and distinct from the other fluid connections, or be shared with the other fluid connections. The return manifold can additionally include a relief valve 164 that controls fluid flow therethrough. The relief valve can be passive or active, and can be uni-directional, bi-directional, or facilitate fluid flow in any suitable number of directions. In one variation, the relief valve is selectively operable between an open and a closed mode, wherein the relief valve operates in the open mode in response to fluid channel pressure exceeding a threshold pressure (e.g., a cracking pressure), and operates in the closed mode in response to fluid channel pressure falling below the threshold pressure. However, the relief valve can be actively controlled (e.g., by a processor), or be operated in any other suitable manner.

As shown in FIG. 14, the return vessel can additionally be fluidly connected (fluidly coupled) to the reservoir, wherein fluid within the return vessel can flow to the reservoir. Alternatively, fluid can flow from the reservoir to the return vessel. Alternatively, the return vessel can be fluidly separate and distinct from the reservoir. The return vessel can be fluidly connected to the reservoir by a secondary fluid manifold. The secondary fluid manifold can be fluidly separate and distinct from the other fluid connections, or be shared with the other fluid connections. The secondary fluid manifold can additionally include a valve 162 that controls fluid flow therethrough. The valve can be active or passive. Examples of the valve 162 include a check valve, button valve, butterfly valve, ball valve, or any other suitable valve. The valve can permit fluid flow from the return volume to the reservoir in response to the return volume pressure exceeding a threshold pressure, in response to the reservoir pressure falling below a threshold pressure (e.g., in response to fluid draw from the reservoir by the pump, in response to active valve opening, or in response to any other suitable event. Alternatively or additionally, the valve can permit fluid flow from the reservoir to the return volume, prevent fluid flow from the reservoir to the return volume, or enable any other suitable fluid flow pattern.

In one variation, as shown in FIG. 12, the fluid channel can include a first and second opposing end, wherein the reservoir is arranged adjacent a first end of the fluid channel and the return vessel is arranged adjacent the second end of the fluid channel. In a second variation, the reservoir fluidly connected to the first end of the fluid channel and the return vessel is fluidly connected to the second end of the fluid channel. In these variations, a secondary fluid manifold can additionally fluidly connect the reservoir and return vessel. However, the return vessel can be otherwise arranged relative to the fluid channel and/or reservoir. In one example, fluid flows from the reservoir, into the fluid channel, into the return volume, and through the secondary fluid manifold back into the reservoir. In this example, the force driving fluid flow can be a negative pressure differential generated by the displacement device, a positive pressure applied to the reservoir fluid, or be any other suitable driving force. However, fluid can otherwise flow between the reservoir and the return volume. The return vessel can be defined by a component separate and distinct from that defining the reservoir, be defined by the same component as that defining the reservoir, be defined by the substrate, or be defined by any other suitable component.

Figure 17A:
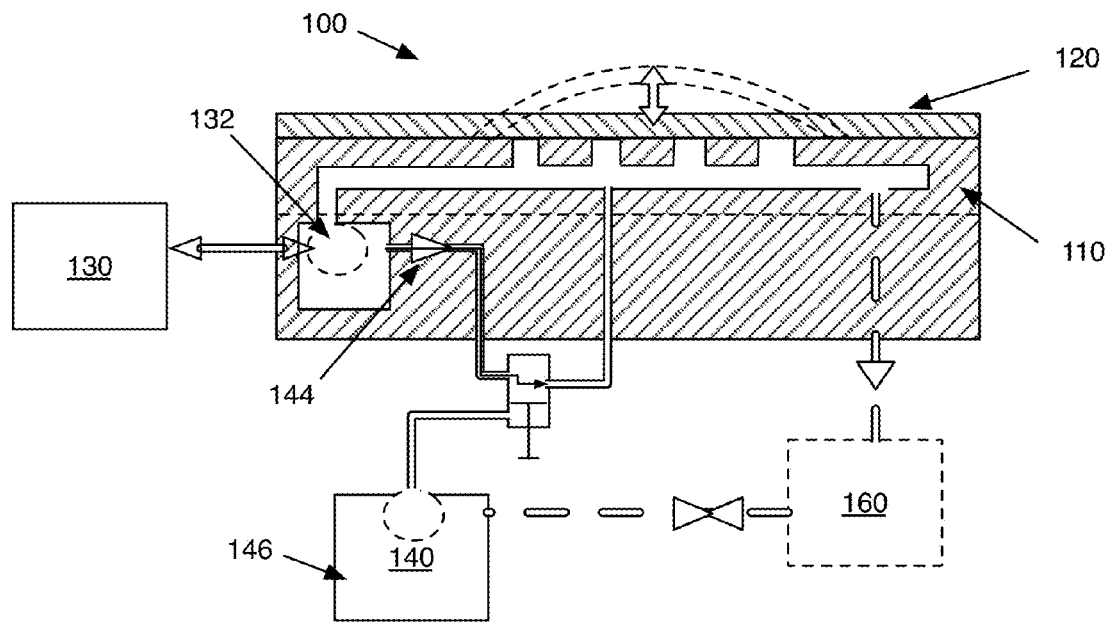
FIG. 17A is a schematic representation of a variation of the dynamic tactile interface with a button valve in the first position.
Figure 17B:
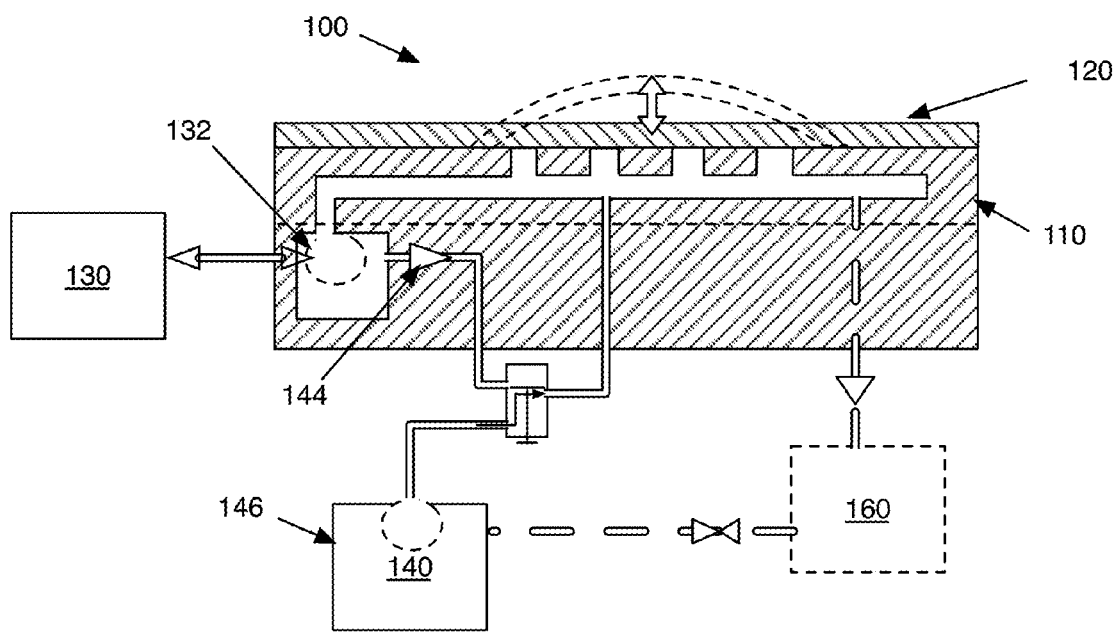
FIG. 17B is a schematic representation of a variation of the dynamic tactile interface with a button valve in the second position.
Figure 18:
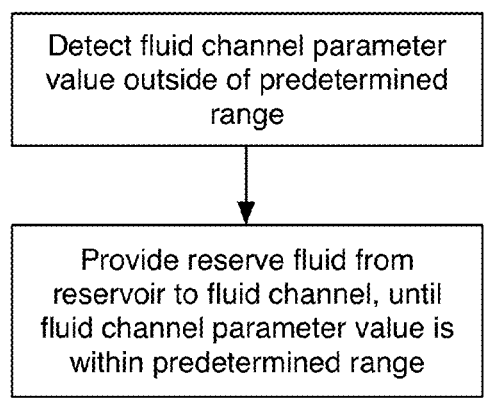
FIG. 18 is a schematic representation of a method of dynamic tactile interface control.
Figure 19:
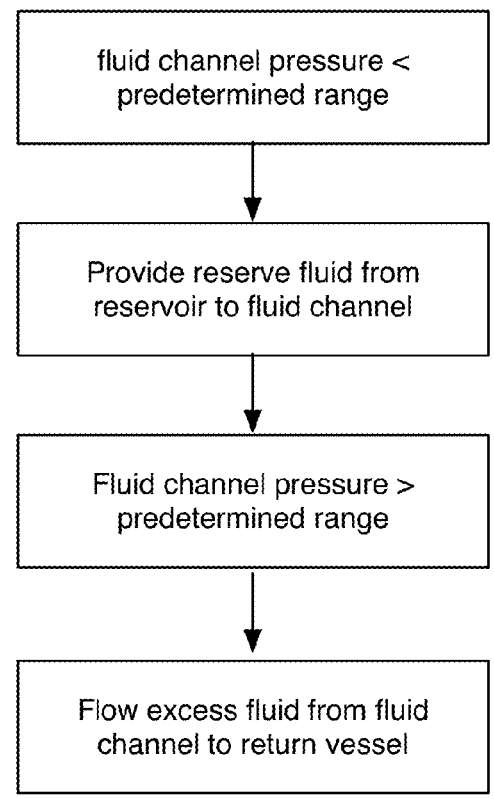
FIG. 19 is a schematic representation of a variation of the method of dynamic tactile interface control.

As shown in FIGS. 17A and 17B, the dynamic tactile interface 100 can additionally include a button valve 142. The button valve functions to selectively control fluid flow between the bladder and the fluid channel, and between the reservoir and the fluid channel. The button valve preferably includes first, second, and third port, wherein the first port can be fluidly connected to the bladder, the second port can be fluidly connected to the reservoir, and the third port can be fluidly connected to the fluid channel. The button valve is preferably operable between at least a first and a second position. In the first position, the button valve opens a fluid path between the first port and the third port, such that the bladder and fluid channel are connected. The button valve preferably fluidly isolates the second port from the fluid path (e.g., closes the second port) in the first position. In the second position, the button valve opens a second fluid path between the second port and the third port, such that the reservoir and fluid channel are connected. The button valve preferably fluidly isolates the first port from the second fluid path (e.g., closes the first port) in the second position. In one variation, the button valve can operate in the first position to expand the deformable region (e.g., from the retracted setting to the expanded setting), using fluid from the bladder. In this variation, the button valve can operate in the second position to supplement deformable region expansion with fluid from the reservoir (e.g., wherein the reservoir pressure is higher than the fluid channel pressure), or operate in the second position to transition the expanded deformable region to the retracted state (e.g., wherein the reservoir pressure is lower than the fluid channel pressure). The button valve can be actively controlled (e.g., by a processor, based on a pressure sensor, etc.), or be passively controlled. However, the button valve can operate in any other suitable manner. Alternatively, a button valve can be fluidly connecting the pump, the bladder, and the reservoir, wherein the first port is fluidly connected to the pump, the second port fluidly connected to the reservoir, and the third port fluidly connected to the bladder (which, in turn, is fluidly connected to the fluid channels). In this variation, the button valve can fluidly connect the pump and bladder in the first position, and fluidly connect the reservoir and bladder in the second position. However, the button valve can be otherwise arranged and connected.

The dynamic tactile interface can additionally include an imperfect check valve 144 that functions to drain the bladder. The imperfect check valve can be arranged in the fluid connection between the bladder and the button valve (e.g., in the first button valve placement variant, above), arranged in the fluid connection between the button valve and pump (e.g., in the second button valve placement variant, above), be fluidly connected to the fluid channel, or be arranged in any other suitable position within the fluid circuit. In one variation, the imperfect check valve resists fluid backflow into the bladder during fluid supply from the reservoir (e.g., in response to button valve operation in the second position). However, the imperfect check valve can operate in any other suitable manner. However, any other suitable valve can be used.

4. Reserve Fluid

As described above, the reservoir 140 can contain reserve fluid that differs from the stock or initial fluid in the fluid circuit to compensate for unbalanced (i.e., unequal) rates of loss of particular components of fluid from the fluid circuit. Because different components of fluid in the fluid circuit may have different (average) indices or refraction, Abbe numbers, viscosities, boiling temperatures, and/or freezing temperatures, etc. such that different combinations of fluid components in the fluid circuit may yield different effective refractive indices, different Abbe numbers, different flow rates, different rise and fall times of deformable regions of the dynamic tactile layer, etc., thereby yielding different optical and tactile properties when pumped through fluid channels in the dynamic tactile layer. Thus, unbalanced loss of components of the fluid from the dynamic tactile interface over time—such as from absorption or evaporation—may adversely affect optical transparency of the dynamic tactile layer, thereby increasingly reducing the capacity of the dynamic tactile layer to communicate clear images from a display arranged behind the dynamic tactile layer to a user.

In an example similar to that described above, the initial fluid in the fluid circuit can contain five parts component A, two parts component B, and one part component C. In this example, the dynamic tactile layer can absorb component A at a rate of 0.1 milliliters per 1000 hours and component B at a rate of 0.1 milliliters per 1000 hours but not absorb component C. Furthermore, in this example, component A can evaporate from the dynamic tactile interface at a rate of 0.4 milliliters per 1000 hours and component C can evaporate from the fluid circuit at a rate of 0.1 milliliters per 1000 hours. Thus, in this example, the reservoir can contain a reserve fluid with twenty-five parts component A, two parts component B, and one part component C, such that unbalanced loss of each component of the fluid from the fluid circuit is compensated for by the composition of the reserve fluid contained in the reservoir.

In this implementation, the valve 150, the displacement device, and/or the dynamic tactile layer can further include a mechanical structure that induces mixing between the reserve fluid and the stock fluid in the fluid circuit. Alternatively, the dynamic tactile interface can include a device that actively mixes fluids from the fluid circuit and the reservoir.

A variation of the dynamic tactile interface 100 can include a housing supporting the substrate no, the tactile layer 120, the haptic element, and the displacement device 130 (and the bladder), the housing engaging a computing device and retaining the substrate 110 and the tactile layer 120 over a display of the computing device. The housing can also transiently engage the mobile computing device and transiently retain the substrate 110 over a display of the mobile computing device. Generally, in this variation, the housing functions to transiently couple the dynamic tactile interface 100 over a display (e.g., a touchscreen) of a discrete (mobile) computing device, such as described in U.S. patent application Ser. No. 12/830,430. For example, the dynamic tactile interface 100 can define an aftermarket device that can be installed onto a mobile computing device (e.g., a smartphone, a tablet) to update functionality of the mobile computing device to include transient depiction of physical guides or buttons over a touchscreen of the mobile computing device. In this example, the substrate no and tactile layer 120 can be installed over the touchscreen of the mobile computing device, a manually-actuated displacement device 130 can be arranged along a side of the mobile computing device, and the housing can constrain the substrate no and the tactile layer 120 over the touchscreen and can support the displacement device. However, the housing can be of any other form and function in any other way to transiently couple the dynamic tactile interface 100 to a discrete computing device.

The dynamic tactile interface can additionally include one or more sensors 170 that function to detect parameters of the fluid pumped into, pump out of, or residing within the dynamic tactile layer, wherein the dynamic tactile interface can operate based on the measured parameter values. The sensors can include a pressure sensor, optical sensor (e.g., light sensor configured to measure the optical properties of the fluid), or be any other suitable sensor. The sensor is preferably fluidly coupled to the fluid channel, but can alternatively be fluidly coupled to any other suitable fluid volume. The sensor can be directly fluidly connected to the fluid channel, fluidly connected to the bladder, fluidly connected to the reservoir, fluidly connected to the return vessel, or be connected to any other suitable portion of the fluid. In one variation, the pressure sensor measures the instantaneous or relative pressure of the fluid (e.g., absolute pressure, pressure relative to the ambient environment, etc.). In a second variation, the pressure sensor measures the change in fluid pressure over time. For example, the pressure sensor can detect a particular rate of fluid pressure change exceeding a threshold rate (e.g., detecting a gradual decline in the fluid channel fluid pressure, over a particular time duration, that is faster than the threshold rate). In response to detection of fluid pressure decline, the dynamic tactile interface can transfer a volume of fluid from the reservoir into the fluid channel at a rate substantially proportional (e.g., equal to, within margins of error, etc.) to the gradual decline in fluid pressure.

In a first example, the dynamic tactile interface transfers an amount of fluid from the reservoir to accommodate for fluid lost from the fluid channel and/or bladder. In this example, reserve fluid can be transferred to the fluid channel until the pressure sensor measures a fluid channel pressure substantially equal to a predetermined pressure or the pressure prior to fluid loss (e.g., the amount of reserve fluid can be empirically determined). Alternatively, the dynamic tactile interface can automatically determine (e.g., calculate) the amount of reserve fluid required to supplement the fluid within the fluid channel. However, the amount of reserve fluid supplied to the fluid channel can be otherwise determined.

Alternatively or additionally, the dynamic tactile interface can selectively supply reserve fluid to accommodate for losses in fluid components, wherein the losses in fluid components can be determined by sensors directly measuring the amount and/or presence of the fluid components, or be determined by sensors that measure the effects of fluid component loss. For example, the sensor can directly measure fluid component A, and selectively control the reservoir to supply reserve fluid until a predetermined proportion or amount of fluid component A within the fluid of the fluid channel is met. In another example, the sensor can measure the optical property change (absolute or relative), and supply an amount of reserve fluid to accommodate for the optical property change. However, the fluid parameters can be otherwise used.

The dynamic tactile interface can additionally include or be coupled to a display 10 that functions to render an image. The display can include a screen portion rendering the image and a periphery portion substantially surrounding the screen. The display or dynamic tactile interface can additionally include a sensor 20 coupled to the substrate opposite a tactile surface of the tactile layer and outputting signal in response to an input at a tactile surface of the tactile layer. The sensor can extend over all or a portion of the screen. The sensor can be a touch sensor, capacitive sensor (e.g., an ITO layer), resistive sensor, or be any other suitable sensor. However, the display can additionally or alternatively include any other suitable component.

The display is preferably coupled to the substrate opposite the tactile layer, and the deformable region is preferably substantially aligned with the image (e.g., within centimeters, millimeters, or microns of error). The reservoir and the bladder can be mounted, removably connected, or otherwise coupled to: a back surface of the substrate proximal or aligned with the periphery portion of the display; a back surface of the display opposing the active face of the screen; a front surface of the substrate proximal or aligned with the periphery portion of the display; or be arranged in any other suitable position. However, the display can be otherwise arranged relative to the dynamic tactile interface.

The systems and methods of the preceding embodiments can be embodied and/or implemented at least in part as a machine configured to receive a computer-readable medium storing computer-readable instructions. The instructions can be executed by computer-executable components integrated with the application, applet, host, server, network, website, communication service, communication interface, native application, frame, iframe, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention defined in the following claims.

We claim:

1. A method of regulating fluid pressure in a dynamic tactile interface comprising a tactile layer, a substrate, and a displacement device, the tactile layer comprising a deformable region and a peripheral region adjacent the deformable region, a substrate defining a fluid channel and cooperating with the deformable region to define a variable volume fluidly coupled to the fluid channel, the displacement device fluidly coupled to the fluid channel, the method comprising:
   at a pressure sensor, sensing a pressure of fluid in the fluid channel;
   in response to the pressure of fluid falling below a particular pressure, displacing a volume of reserve fluid from the reservoir through the valve into the fluid channel, the valve resisting back flow of fluid from the fluid channel into the reservoir;
   detecting a second pressure of the fluid in the fluid channel; and
   in response to the second pressure greater than the particular pressure, displacing fluid through a second valve into a return vessel fluidly coupled to the fluid channel and the reservoir, the second valve resisting back flow of fluid from the return vessel into the fluid channel.

2. The method of claim 1, further comprising:
  detecting a particular rate of fluid pressure change, comprising a gradual decline in fluid pressure in the fluid channel over a particular time with the pressure sensor; and
  in response to the particular rate greater than a threshold rate, transferring a second volume of reserve fluid from the reservoir into the fluid channel, at a rate proportional to the gradual decline in fluid pressure.

3. The method of claim 1, further comprising, at a processor:
  determining the volume of reserve fluid to displace into the fluid channel based on the sensed fluid pressure and the particular pressure with a processor; and
  controlling the valve to dispense the determined volume of reserve fluid into the fluid channel.

\* \* \* \* \*